(12) United States Patent
Jung et al.

(10) Patent No.: US 8,639,814 B2
(45) Date of Patent: Jan. 28, 2014

(54) ELECTRONIC APPARATUS, VIRTUAL MACHINE PROVIDING APPARATUS, AND METHOD OF USING VIRTUAL MACHINE SERVICE

(75) Inventors: Myung-june Jung, Suwon-si (KR); Sang-bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 724 days.

(21) Appl. No.: 12/697,452

(22) Filed: Feb. 1, 2010

(65) Prior Publication Data

US 2010/0198973 A1    Aug. 5, 2010

(30) Foreign Application Priority Data

Feb. 2, 2009    (KR) .................. 10-2009-0007970

(51) Int. Cl.
*G06F 15/173*    (2006.01)
(52) U.S. Cl.
USPC .......................................... 709/226; 709/223
(58) Field of Classification Search
USPC .............. 709/203, 217, 219, 223–229; 718/1, 718/100
See application file for complete search history.

(56) References Cited

U.S. PATENT DOCUMENTS

| | | | | |
|---|---|---|---|---|
| 6,496,847 | B1 * | 12/2002 | Bugnion et al. | 718/1 |
| 7,191,440 | B2 * | 3/2007 | Cota-Robles et al. | 718/1 |
| 7,380,049 | B2 | 5/2008 | Rajagopal et al. | |
| 7,424,709 | B2 * | 9/2008 | Neiger et al. | 718/1 |
| 7,581,219 | B2 * | 8/2009 | Neiger et al. | 718/1 |
| 7,992,209 | B1 * | 8/2011 | Menoher et al. | 726/26 |
| 8,332,517 | B2 * | 12/2012 | Russell | 709/226 |
| 8,336,046 | B2 * | 12/2012 | Bowman et al. | 718/1 |
| 2002/0013802 | A1 * | 1/2002 | Mori et al. | 709/1 |
| 2004/0117539 | A1 * | 6/2004 | Bennett et al. | 711/6 |
| 2005/0132362 | A1 | 6/2005 | Knauerhase et al. | |
| 2006/0074618 | A1 * | 4/2006 | Miller et al. | 703/13 |
| 2006/0085785 | A1 * | 4/2006 | Garrett | 718/1 |
| 2006/0090136 | A1 * | 4/2006 | Miller et al. | 715/734 |
| 2007/0110244 | A1 * | 5/2007 | Sood et al. | 380/270 |
| 2007/0129101 | A1 | 6/2007 | Wang et al. | |
| 2008/0040716 | A1 | 2/2008 | Lam et al. | |
| 2008/0062965 | A1 | 3/2008 | Silva et al. | |
| 2008/0072287 | A1 | 3/2008 | Movva et al. | |

(Continued)

FOREIGN PATENT DOCUMENTS

CN    101211272 A    7/2008
KR    10-2006-0108711 A    10/2006

OTHER PUBLICATIONS

European Search Report issued on Feb. 22, 2011, in corresponding European Application No. 10152268.8 (5 pages).

(Continued)

*Primary Examiner* — Sargon Nano
(74) *Attorney, Agent, or Firm* — NSIP Law

(57) ABSTRACT

An electronic apparatus in which a virtual machine (VM) runs like a physical device, a VM providing apparatus, and a method of transmitting and receiving a VM service using the electronic apparatus and the VM providing apparatus are provided. The electronic apparatus creates, when a VM is executed, a first domain zone having one or more VMs embedded in the electronic apparatus and a second domain zone having one or more VMs downloaded from a VM providing apparatus, and the control unit controls the first and second domain zones.

12 Claims, 5 Drawing Sheets

(56) References Cited

U.S. PATENT DOCUMENTS

| | | | |
|---|---|---|---|
| 2008/0163210 A1* | 7/2008 | Bowman et al. | 718/1 |
| 2008/0187023 A1* | 8/2008 | Jankowski et al. | 374/152 |
| 2008/0219240 A1 | 9/2008 | Dylag et al. | |
| 2008/0244257 A1* | 10/2008 | Vaid et al. | 713/2 |
| 2009/0265756 A1* | 10/2009 | Zhang et al. | 726/1 |
| 2010/0017879 A1* | 1/2010 | Kuegler et al. | 726/23 |
| 2011/0145418 A1* | 6/2011 | Pratt et al. | 709/227 |
| 2011/0252116 A1* | 10/2011 | Menoher et al. | 709/217 |

OTHER PUBLICATIONS

Payne et al., "Lares: An Architecture for Secure Active Monitoring Using Virtualization," *Proceedings of the IEEE Symposium on Security and Privacy*, May 2008, pp. 1-15.

Rosenblum et al., "Virtual Machine Monitors: Current Technology and Future Trends," *IEE Computer Magazine*, May 2005, pp. 39-47.

Chinese Office Action issued Jul. 8, 2013 in counterpart Chinese Application No. 201010104348.7 (26 pages, in Chinese, with complete English Translation).

* cited by examiner

ELECTRONIC APPARATUS, VIRTUAL MACHINE PROVIDING APPARATUS, AND METHOD OF USING VIRTUAL MACHINE SERVICE

CROSS-REFERENCE TO RELATED APPLICATION

This application claims the benefit under 35 U.S.C. §119(a) of a Korean Patent Application No. 10-2009-0007970, filed Feb. 2, 2009, the entire disclosure of which is incorporated herein by reference for all purposes.

BACKGROUND

1. Field

The following description relates to virtualization technology, and more particularly, to virtualization technology using a virtual machine.

2. Description of the Related Art

Until now, a different chipset and physical device for each mobile service provider has been released in the mobile phone market. That is, a different chipset has been manufactured to support a service offered by each mobile service provider, and a different physical device has been manufactured according to requirements of each mobile service provider. Thus, the same product produced by a handset manufacturer has been manufactured into different models for different mobile service providers. This situation has been created because it is customary for a handset manufacturer to manufacture mobile phone hardware according to requirements of each mobile service provider.

If a user has to change the name of the owner of a device due to unavoidable circumstances, wants to terminate subscription to services and subscribe to new services, or if the user wants to purchase a new device, the user generally carries out very complicated tasks to manage user data and to reuse user data and applications that the user has been using. To move data to each new device is a cumbersome and time consuming process. Furthermore, although the data is moved to each new device, there is no guarantee that applications for handling the data will be usable in the new device.

In addition, when applications corresponding to previous applications frequently used by the user are provided in the new device, their names and forms may not be the same as those of the previous applications. Therefore, after the applications corresponding to the previous applications are installed in the new device, it must be identified whether the applications corresponding to the previous applications exist in the new device, and, if they exist, the names of the applications corresponding to the previous applications must be identified. Even when the names of the applications corresponding to the previous applications are identified, it is also another important challenge to read data that has been generated by the previous applications, from the applications corresponding to the previous applications, and re-use the read data.

Virtualization technology enables devices, such as personal computers (PCs), personal digital assistants (PDAs), digital televisions (DTVs), and the like, to strengthen security and implement various applications and services. To provide a secure environment, virtualization technology should provide secure booting, secure software, access control, and the like.

SUMMARY

In one general aspect, provided is an electronic apparatus comprising a domain unit comprising a first domain zone having an embedded virtual machine and a second domain zone having one or more downloaded virtual machines (VMs), the first domain zone including a control unit to manage an allocation of virtual resources to the second domain zone, a hardware component to be used by the domain unit, and a virtual machine monitor to manage an access of the domain unit to the hardware component.

The first domain zone may comprise a plurality of first domains and the second domain zone may comprise a plurality of second domains.

The control unit may manage allocation of virtual resources to the second domains included in the second domain zone by monitoring operation of the one or more downloaded VMs.

The domain unit may further comprise a service controller to transmit or receive a signal to receive a virtual machine service from a virtual machine providing apparatus.

The second domain zone may comprise a trusted domain zone and an untrusted domain zone based on accessibility to virtual resources.

The control unit may allocate a downloaded VM to the trusted domain zone or the untrusted domain zone based on a safety rating of the downloaded VM.

The control unit may move a downloaded VM in the untrusted domain zone to the trusted domain zone when the safety rating of the downloaded VM is higher than a preset level, and may move the downloaded VM in the trusted domain zone to the untrusted domain zone when the safety rating of the downloaded VM is lower than the preset level.

The control unit may move the downloaded VM in the untrusted domain zone to the trusted domain zone after receiving an approval signal from a user of the electronic apparatus.

The control unit may automatically move the downloaded VM in the trusted domain zone to the untrusted domain zone.

The first domain zone may further include a storage unit to store data commonly used by virtual domains included in the first domain zone and the second domain zone.

In another aspect, provided is a method of managing virtual machines (VMs) in a mobile terminal including an embedded domain zone having one or more VMs embedded therein, and a downloaded domain zone, the method comprising establishing a communication channel with a VM providing apparatus, receiving from the VM providing apparatus, one or more downloaded VMs, determining whether the one or more downloaded VMs should be stored in a trusted domain zone or an untrusted domain zone of the downloaded domain, and storing the one or more downloaded VMs;

The determining may be based on a safety rating of the one or more downloaded VMs.

In another aspect, provided is a mobile terminal for executing virtual machines (VMs), the mobile terminal comprising a means for establishing communication between the mobile terminal and a VM providing apparatus, a domain unit comprising an embedded domain zone that includes one or more embedded VMs, and a downloaded domain zone that includes one or more downloaded VMs that are downloaded from a VM providing apparatus, a VM execution unit for executing the embedded VMs and the downloaded VMs, a controller for controlling the embedded VMs and the downloaded VMS and for providing a user interface (UI) to a user to allow the user to interact with the mobile terminal, and a storage unit that stores data for use by the embedded VMs and the downloaded VMs.

The means for establishing communication with the VM providing apparatus may be a wireless communication channel.

The means for establishing communication with the VM providing apparatus may be a wired communication channel.

The mobile terminal may establish a wired communication channel with a fixed terminal, and may establish communication with the VM providing apparatus via the fixed terminal.

The controller may update embedded VMs and may install downloaded VMs.

The VM execution unit may execute an embedded VM, the controller may create the embedded VM domain zone, and when the VM execution unit executes a downloaded VM, the controller may create the downloaded domain zone.

The mobile terminal may further comprise a device driver unit for driving the hardware of the mobile terminal and providing an abstract device driver interface.

The controller may monitor the status of the downloaded VMs and determines, based upon the monitoring, to raise or lower a safety rating of the downloaded VMs.

The controller may monitor the status of the downloaded VMs and allocate, based upon the monitoring, virtual resources to the embedded VMs and the downloaded VMs.

The controller may transmit at least one of user profile information, user preference information, and device information, to the VM providing apparatus.

The user profile information may include at least one of user authentication information, information to be used to identify a user's needs, and analysis information of a user's behavior.

The user preference information may include at least one of information about VMs that a user is interested in and information about VMs used by a user.

The device information may include at least one of configuration information of hardware of the mobile terminal and information about characteristics of the mobile terminal.

The downloaded domain zone may further include a trusted domain zone and an untrusted domain zone.

The controller may determine whether a downloaded VM is included in the trusted domain zone or the untrusted domain zone, based upon a safety rating of the downloaded VM.

The controller may monitor the status of the downloaded VMs in the untrusted domain, increase the safety rating of a downloaded VM such that the safety rating is above a preset level, and ask a user, via the UI, whether the user would like to transfer the downloaded VM from the untrusted domain to the trusted domain.

The controller may monitor the status of the downloaded VMs in the trusted domain, decrease the safety rating of a downloaded VM such that the safety rating is below a preset level, transfer the downloaded VM from the trusted domain to the untrusted domain, and inform the user of the transferred downloaded VM.

The controller, via the user interface, may receive user input including VM configurations of a desired VM.

In another aspect, provided is a virtual machine (VM) providing apparatus for providing VMs to one or more terminals, the apparatus comprising a means for establishing communication between the VM providing apparatus and a terminal, a service request receiving unit for receiving a service request signal from a terminal, a VM providing unit for analyzing the service request signal and generating a VM list based upon the analyzed service request signal, and a VM downloading unit that receives a selection from a terminal and provides one or more selected VMs so that they may be downloaded by the terminal;

The service request signal may include user profile information, and the VM providing unit may analyze the user profile information and provide the VM list based upon the analyzed user profile information.

The user profile information may include at least one of user authentication information, user preference information, and analysis information of the user's behavior.

The service request signal may include user preference information, and the VM providing unit may analyze the user preference information and provide the VM list based upon the analyzed user preference information.

The user preference information may include at least one of information about the VMs used by the user of a terminal and information about VMs that the user is interested in.

The service request signal may include device profile information, and the VM providing unit may analyze the device profile information and provide the VM list based upon the analyzed device profile information.

The device profile information may include at least one of configuration information of the hardware of a terminal and information about the characteristics of the terminal.

The VM providing unit may analyze virtual resource state information of a terminal, and recommend to the terminal, based upon the virtual resource state information, a method by which the terminal may utilize virtual resources.

The VM providing unit may analyze VMs already downloaded to a terminal, and configure the VMs already downloaded to the terminal.

In another aspect, provided is a fixed terminal for executing virtual machines (VMs), the fixed terminal comprising a means for establishing communication between the fixed terminal and a VM providing apparatus, a domain unit comprising an embedded domain zone that includes one or more embedded VMs, and a downloaded domain zone that includes one or more downloaded VMs that are downloaded from a VM providing apparatus, a VM execution unit for executing the embedded VMs and the downloaded VMs, a controller for controlling the VMs and for providing a user interface (UI) to a user to allow the user to interact with the fixed terminal, and a storage unit that stores data for use by the embedded VMs and the downloaded VMs.

Other features and aspects will be apparent from the following detailed description, the drawings, and the claims.

Figure 1:
FIG. 1 is a diagram illustrating an example of a virtual machine (VM) system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a virtual machine (VM) system. Referring to FIG. 1, the example VM system includes an electronic apparatus 1 and a VM providing apparatus 2.

The electronic apparatus 1 may be a mobile terminal that may be easily transported, such as a mobile phone. The electronic apparatus may be a fixed terminal that may be used in a fixed location, such as a desktop computing system. The VM providing apparatus 2 provides a VM service to the electronic apparatus 1. For example, the VM providing apparatus 2 may provide a VM selected by a user to the electronic apparatus 1. A VM may be an operating system that runs in a virtualization environment, an application program that is supported by the operating system, or a combination of both.

For example, a user may access the VM providing apparatus 2 using the electronic apparatus 1 and then search the VM providing apparatus 2 for a desired VM or configure a new VM with desired specifications. The VM providing apparatus 2 may recommend a VM suitable for the user. The VM providing apparatus 2 may provide the electronic apparatus 1 with information about whether a VM may be installed in the electronic apparatus 1 and/or the amount of resources to be allocated to the VM. This information may be based on the device profile and/or the virtual resource allocation state of the electronic apparatus 1.

Figure 2:
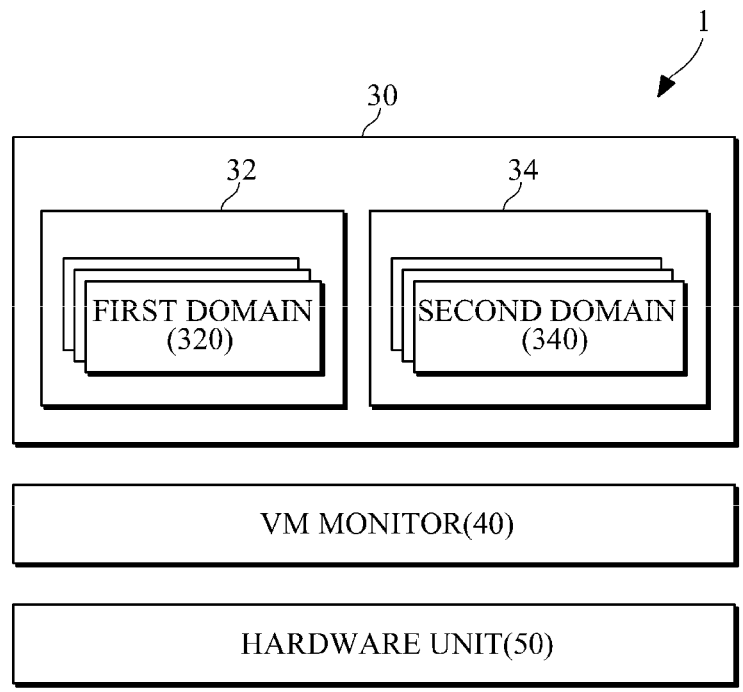
FIG. 2 is a diagram illustrating the hierarchical structure of an example electronic apparatus.

FIG. 2 illustrates the hierarchical structure of an example electronic apparatus that may be used in the VM system illustrated in FIG. 1. Referring to FIG. 1 and FIG. 2, the electronic apparatus 1 includes a hardware unit 50, a domain unit 30, and a VM monitor 40, arranged in a hierarchical order. The domain unit 30 includes a first domain zone 32 having one or more VMs embedded in the electronic apparatus 1 and a second domain zone 34 having one or more VMs downloaded from a VM providing apparatus. Access to the hardware unit 50 by the domain unit 30, is controlled by the VM monitor 40.

The hardware unit 50 is employed as hardware of the electronic apparatus 1, and may further include an authentication and security unit (not shown). The authentication and security unit may be implemented in the form of a universal integrated circuit card (UICC). The UICC may verify the identity of a user or a subscriber to a service offered by a mobile network operator (MNO). The UICC may safely store and protect the user's personal information. The authentication and security unit may be implemented in the form of an advanced UICC (AUICC). The AUICC performs similarly as the UICC but is more efficient in terms of computing resources, such as storage space. The authentication and security unit may be inserted into or removed from the electronic apparatus 1.

The VM monitor 40 is at a higher layer in the hierarchical structure than the hardware unit 50 and controls the access that the domain unit 30 has with the hardware unit 50. For purposes of example, the hardware unit 50 may be referred to as a hardware layer, and the VM monitor 40 may be referred to as a software layer that provides virtualization. The VM monitor 40 may provide hardware virtualization, for example, a virtual central processing unit (CPU), a virtual memory management unit (MMU), a virtual keypad, and the like.

The domain unit 30, in a virtualization environment, includes the first domain zone 32 having one or more VMs embedded in the electronic apparatus 1, and the second domain zone 34 having one or more VMs downloaded from a VM providing apparatus that offers VMs. The first domain zone 32 may include one or more first domains, and the second domain zone 34 may include one or more second domains.

A domain is created when a VM runs. If a VM is embedded in the electronic apparatus 1, it is included in the first domain zone 32. If a VM is downloaded from a VM providing apparatus and installed on the electronic apparatus 1, it is included in the second domain zone 34. In this regard, the first domain zone 32 may also be referred to as a built-in domain zone, and the second domain zone 34 may also be referred to as a downloaded VM domain zone.

Figure 4:
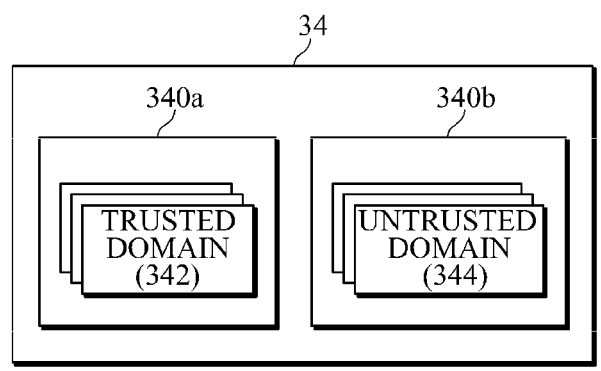
FIG. 4 is a diagram illustrating the hierarchical structure of an example of the second domain zone illustrated in FIG. 2.

Meanwhile, the second domain zone 34 is a domain that may be created when a downloaded VM is executed. Referring to FIG. 4, which will be further described herein, the second domain zone 34 may include a trusted domain zone 340a and an untrusted domain zone 340b. When a VM is downloaded to the electronic apparatus 1 from a VM providing apparatus, the VM may be included in the untrusted domain zone 340b, based on policy settings. The policy settings may be designed for minimizing security problems. Accordingly, allocation of resources to the VM included in the untrusted domain zone 340b may be limited. In some cases, a VM included in the untrusted domain zone 340b may be moved to the trusted domain zone 340a. Conversely, a VM included in the trusted domain zone 340a may be moved to the untrusted domain zone 340b.

Figure 3:
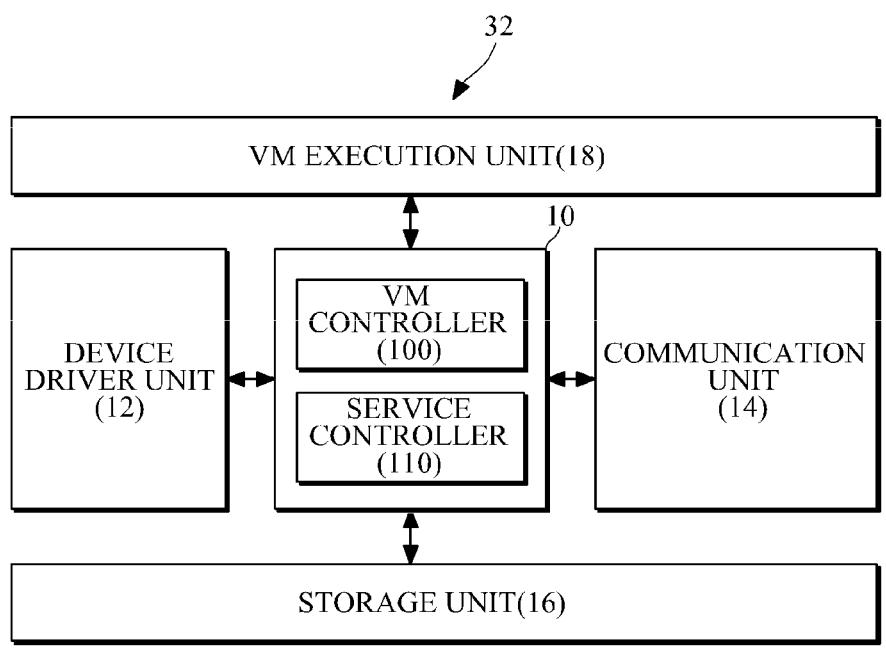
FIG. 3 is a diagram illustrating an example of the first domain zone of the electronic apparatus illustrated in FIG. 2.

FIG. 3 illustrates an example of the first domain zone of the electronic apparatus illustrated in FIG. 2. Referring to FIG. 2 and FIG. 3, the first domain zone 32 of electronic apparatus 1 includes a VM execution unit 18, a control unit 10, a device driver unit 12, a communication unit 14, and a storage unit 16.

The control unit 10 may include a VM controller 100 and a service controller 110. The VM controller 100 may allocate virtual resources to the VMs embedded in the electronic apparatus 1 and the VMs downloaded from the VM providing apparatus 2. In addition, the VM controller 100 may monitor the downloaded VMs and control domains included in the second domain zone 34.

For example, the VM controller 100 may provide a control interface for a virtualization environment as well as for VMs. The VM controller 100 may allow other modules to use functions that it offers. To this end, various methods including a shared memory and a service daemon using inter-process communication or general socket communication, may be utilized.

The VM controller 100 may control VMs. For example, the VM controller 100 may control a VM to start, stop, suspend, resume, export, import, and/or the like. The VM controller 100 may monitor the status of the VM. For system operation, the VM controller 100 may control, for example, system performance and security of the electronic apparatus 1, based on a virtualization environment management policy. The VM controller 100 may update a VM in the first domain zone 32 and/or install a VM downloaded to the second domain zone 34. When installing a VM, the VM controller 100 may allocate resources to run the VM according to characteristics and/or meta information of the VM.

The VM controller 100 may determine whether to run a VM in the trusted domain zone 340a or in the untrusted domain zone 340*b*, based on characteristics and/or meta information of the VM. The VM controller 100 may monitor the operation of a downloaded VM and move the downloaded VM from the trusted domain zone 340*a* to the untrusted domain zone 340*b*, or vice versa, based on the monitoring result. The downloaded VM may be monitored to determine which system resources the downloaded VM attempts to access.

For example, if the downloaded VM tries to access a system resource to which it has no reason or authority to access, the downloaded VM may be moved from the trusted domain to the untrusted domain. As another example, if a downloaded VM attempts to access an allowed resource, but the downloaded VM is attempting to access more than is needed, the downloaded VM may be moved to the untrusted domain. System resources include, for example, central processing unit (CPU) time, memory, network storage, input/output (I/O) devices, and the like.

By monitoring the downloaded VMs, the VM controller 100 may determine whether a downloaded VM is using or continuing to use a resource beyond what is typically needed. In this example, a downloaded VM may be over using CPU time, memory, I/O resources, and the like, thus decreasing overall system performance. The downloaded VMs may be monitored for safety reasons, for example, to determine if a downloaded VM is attempting to access unauthorized memory addresses, attempting to change the operation of the system, trying to retrieve personal/private information, and the like.

The VM controller 100 may control the allocation of processor resources, system memory, storage space to VMs, and/or the setting of I/O resources. I/O resources include, for example, network interfaces, graphic resources, audio resources, keyboards, modems, network cards, and the like. The VM controller 100 may allow a VM to use more resources or limit the VM in its use of resources.

The VM controller 100 may analyze the operation of a downloaded VM and generate data based on the amount and/or type of resources that are to be used by the downloaded VM. The VM controller 100 may use the generated data to determine the resource state of the downloaded VM. The VM controller 100 may compare the data to standards, for example, predefined standards, make a determination, and reallocate resources to the downloaded VM based on the determination. For example, the VM controller 100 may allocate more resources to frequently used VMs, thereby enhancing user satisfaction with the electronic apparatus 1.

The VM controller 100 may monitor a user's behavior in using downloaded VMs and set a target VM or a plurality of VMs to be monitored, and may set whether to log the result of monitoring the target VM. For example, the VM controller 100 may monitor and log how many times a downloaded VM is booted and used, how long the downloaded VM is used in the foreground and background of a domain, and/or which hardware resources are used by the downloaded VM.

The service controller 110 may control the communication unit 14 to transmit or receive signals that may be used to receive a VM service from the VM providing apparatus 2. For example, the service controller 110 may provide an interface, for example, a user interface (UI), by which a user may interact with the VM providing apparatus 2, to use a VM service offered by the VM providing apparatus 2. To implement the interface, a web browser or a dedicated client that understands a VM protocol and offers a user-friendly interface, may be used. The communication unit 14 may use an engine that implements a VM service protocol designed to overcome or avoid security threats or communication channel problems that may arise during communication between the electronic apparatus 1 and the VM providing apparatus 2.

When requesting the VM providing apparatus 2 to provide a VM service, the service controller 110 may transmit information about the electronic apparatus 1 that may be helpful to use the VM service to the VM providing apparatus 2 via the communication unit 14. For example, the service controller 110 may transmit the device profile, user profile, and/or virtual resource state information of the electronic apparatus 1.

A user profile is a data set that may include, for example, information to be used to authenticate a user who intends to use a VM service on the electronic apparatus 1, user preference information to be used to identify the user's needs, and/or analysis information of the user's behavior in using VMs. The information to be used to identify a user may include a user ID, a key for authenticating the user, and/or other relevant data. If verification is to be used to authenticate a user who desires to use a service offered by a Mobile Network Operator (MNO) or to identify the state of platform integrity, verification may be done with the UICC or the AUICC described above, with reference to FIG. 2.

User preference information may include, for example, information about VMs used by a user, and/or information about VMs that the user is interested in. After the service controller 110 transmits the user preference information to the VM providing apparatus 2, the VM providing apparatus 2 may inform the service controller 110 when a new VM related to a field of the user's interest will be released and/or recommend a VM that suits the user's preference, based on the received user preference information. As described above, a VM may be an operating system, an application program that runs on the operating system, or a combination of both.

A device profile is a data set that may include, for example, configuration information of the physical hardware of a device, and/or information about characteristics of the device. The device profile may be used, for example, to identify whether the hardware component to be used for the operation of a VM is included in the electronic apparatus 1, whether the hardware component may be driven, whether the hardware component provides general, standardized functions, and/or whether the hardware component provides an extension function. Thus, it is possible to know, in advance, whether a VM desired by a user may run on the electronic apparatus 1.

The virtual resource state information is a data set that may inform a user of the amount of computing resources currently available in the electronic device 1. The electronic apparatus 1 may identify its resource state before selecting or downloading a VM. The electronic apparatus 1 may display the identified resource state on its screen so that the user may determine whether to download and install a VM. The electronic apparatus 1 may analyze its current state based on the identified resource state and provide, for example, methods of downloading, installing, and/or running a VM. For example, the electronic apparatus 1 may advise its user to move an infrequently used VM from an internal memory to an external memory. The electronic apparatus 1 may inform the user of an additional amount of memory to be used for a VM that the user intends to download and install. The electronic apparatus may provide information about links to memory-selling websites, so that the user can add memory to the electronic apparatus 1.

The device driver unit 12 may provide one or more abstract device driver interfaces. Guest operating systems may access and use the physical hardware resources through the abstract device driver interfaces. The device drivers of the guest operating systems may be ported to the abstract device driver interfaces. Accordingly, although the electronic apparatus 1 may be running one or more guest operating systems simultaneously, there is no need for a plurality of device drivers having the same functions to redundantly exist in the guest operating system. In addition, there is no need to update a device driver for each of the guest operating systems because only the device driver for the actual hardware has to be updated. This reduces the maintenance costs for updates and security patches, because while you can run multiple operating systems and programs at the same time, only one update is needed.

The device driver unit 12 may manage installation, uninstallation, and/or update of device drivers. For example, when a new hardware component block is added to the electronic apparatus 1, the device driver unit 12 may install a device driver that will drive the new hardware component block. Also, when a security patch or a driver update is to be added, the device driver unit 12 may install, delete, and/or update the device driver, accordingly. The device driver unit 12 may include a device driver that may drive the physical hardware components of the electronic apparatus 1. In some embodiments, the device driver may already be embedded in the electronic apparatus 1 when the electronic apparatus 1 is released.

The storage unit 16 may provide an abstract interface for accessing data stored in the electronic apparatus 1, so that different operating systems may read and write data in the same way. The storage unit 16 may store data commonly used by VM domains in the first and second domain zones 32 and 34. For example, while data may be stored by each VM domain, data commonly used regardless of the type of VM domain may be stored in the storage unit 16. This makes data management more efficient in case of change or backup of the electronic apparatus 1.

The VM controller 100, the service controller 110, the device driver unit 12, and the storage unit 16, may be included in one domain zone or different domain zones in a hierarchical order. For example, all of the VM controller 100, the service controller 110, the device driver unit 12, and the storage unit 16 may be included in a single domain. In this example, because all of the four elements exist in a single domain zone, the load of managing the virtualization environment is reduced, thereby improving system performance. In addition, resources for operating systems that may exist in domains may be saved.

In another example, the four elements may be allocated to different domains, respectively. In this case, a system failure in any one of the VM domains does not affect the other VM domains. For example, even when a failure occurs in a VM domain while the device driver unit 12 is being updated, the other VM domains may run without any problem. Hence, the system may be diagnosed and recovered. The electronic apparatus may include one or more domains, for example, one domain, two domains, four domains, or more. One or more elements may be allocated to a domain. If the electronic apparatus has a plurality of domains, the number of elements allocated to each may be the same, or they may be different.

FIG. 4 illustrates the hierarchical structure of an example of the second domain zone illustrated in FIG. 2. Referring to FIG. 4, the second domain zone 34 includes the trusted domain zone 340*a* and the untrusted domain zone 340*b*.

VMs may be moved from the trusted domain zone 340*a* to the untrusted domain zone 340*b*, or vice versa. For example, the electronic apparatus 1 may monitor the operation of each VM downloaded from the VM providing apparatus 2 and adjust the safety rating thereof based on the monitoring result. When the safety rating of a downloaded VM is raised to be higher than a predetermined level, the electronic apparatus 1 may inform a user that the downloaded VM has a safety level that exceeds a predetermined level. In some embodiments, the electronic apparatus 1 may suggest to the user that the VM be moved from the untrusted domain zone 340*b* to the trusted domain zone 340*a*. A user may decide to move the VM and the electronic apparatus 1 may be informed of the user's decision on whether to move the downloaded VM. If the electronic apparatus 1 determines that the downloaded VM has been frequently used by the user, used for an extended period of time, and/or that the downloaded VM uses a large amount of computing resources, the electronic apparatus 1 may allocate a large amount of computing resources to a corresponding domain when the downloaded VM is executed. As a result, user satisfaction with the electronic apparatus 1 may be enhanced.

When the electronic apparatus 1 detects a suspicious signal from a downloaded VM in the trusted domain zone 340*a*, it may lower the safety rating of the downloaded VM and move the downloaded VM from the trusted domain zone 340*a* to the untrusted domain zone 340*b*. The electronic apparatus 1 may inform the user of the movement of the downloaded VM and provide the user with reasons determined regarding why the downloaded VM posed a security threat. In some embodiments, the electronic apparatus may detect a suspicious signal from a downloaded VM and inform the user. The user may then decide whether to transfer the VM from the trusted domain zone 340*a* to the untrusted domain zone 340*b*. When the user uses a VM service, the electronic apparatus 1 may caution the user about VMs related to the downloaded VM.

In some embodiments, the electronic apparatus 1 does not need a user's decision to move a VM from the trusted domain zone 340*a* to the untrusted domain zone 340, or vice versa. Instead, the electronic apparatus 1 may move the VM automatically.

In some embodiments, the electronic apparatus 1 may move a VM from the untrusted domain zone 340*b* to the trusted domain zone 340*a*, after gaining the user's approval. The electronic apparatus 1 may move a VM from the trusted domain zone 340*a* to the untrusted domain zone 340*b* without gaining the user's approval, and later inform the user of the movement of the VM. This policy puts system security before convenience of use.

Figure 5:
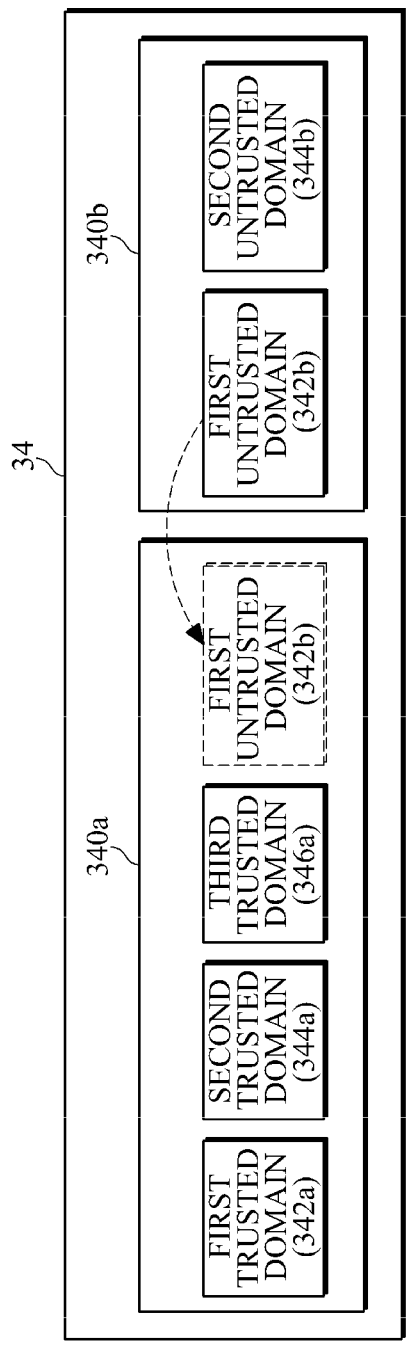
FIG. 5 is a diagram illustrating an example movement of a VM within a second domain zone.

FIG. 5 illustrates an example of the movement of a VM within the second domain zone.

The second domain zone 34 may be configured in various ways. For example, referring to FIG. 5, the second domain zone 34 may include the trusted domain zone 340*a* having a first trusted domain 342*a*, a second trusted domain 344*a*, and a third trusted domain 346*a*, and the untrusted domain zone 340*b* having a first untrusted domain 342*b* and a second untrusted domain 344*b*. FIG. 5 is illustrated for purposes of example. The trusted domain zone 340*a* may include one or more trusted domains, for example, one, two, three, or more trusted domains. The untrusted domain zone 340*b*, may include one or more trusted domains, for example, one, two, three, or more trusted domains.

In this example, the MNO domains and mobile banking domains exist in the trusted domain zone 340*a* and personal information management (PIM) domains and game domains exist in the untrusted domain zone 340*b*. "PIM" denotes an application program that manages personal information, for example, e-mails, schedules, memos, and the like. The MNO domains and the mobile banking domains correspond to VMs that have identifiable sources and the integrity of their content can be guaranteed. Because the safety ratings of these VMs are verified when the VMs are installed, the MNO domains and the mobile banking domains may be verified as safe, and included in the trusted domain zone 340*a*. To verify the safety rating of a VM, code signing, for example, may be used. For example, verification may be performed to determine whether a VM that is to be downloaded has been safely signed by a reliable entity.

VMs corresponding to PIM domains and the game domains may be downloaded from a third-party application program provider, and often their safety cannot be guaranteed. In this example, because safety cannot be guaranteed, the electronic apparatus may include the VMs corresponding to the PIM domains and the game domains in the untrusted domain zone 340*b* at first, manage and monitor them, and move them to the trusted domain zone 340*a* when their safety ratings are raised based on the monitoring result, or when the safety may be verified. For example, a VM downloaded from the VM providing apparatus 2 may be monitored for a predetermined period of time. Referring to FIG. 5, the downloaded VM may be moved from the untrusted domain zone 340*b* to the trusted domain zone 340*a*, based on the monitoring result.

Figure 6:
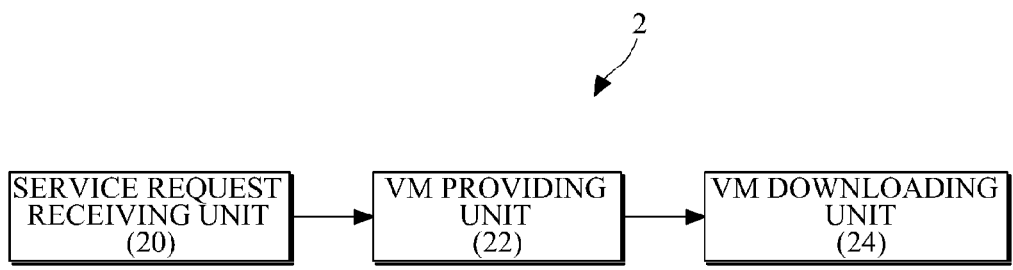
FIG. 6 is a diagram illustrating an example VM providing apparatus.

FIG. 6 illustrates an example of the VM providing apparatus of FIG. 1. Referring to FIG. 1 and FIG. 6, the VM providing apparatus 2 includes a service request receiving unit 20, a VM providing unit 22, and a VM downloading unit 24.

The service request receiving unit 20 receives a VM service request signal from the electronic apparatus 1. In response to the VM service request signal, the VM providing unit 22 generates a VM list and provides the generated VM list to the electronic apparatus 1. The VM service request signal received by the service request receiving unit 20 may include at least one of the device profile, user profile, and/or virtual resource state information of the electronic apparatus 1. In this example, the user profile may include at least one of identification information of a user who uses a VM service, the user's preference information, and/or analysis information of the user's behavior in using VMs. The VM providing unit 22 may generate a VM list based on the information contained in the received VM service request signal and provide the generated VM list to the electronic apparatus 1.

The VM providing unit 22 may generate a list of VMs frequently used or likely to be used by the user based on the information contained in the VM service request signal received from the electronic apparatus 1. The VM providing unit 22 may recommend the generated VM list to the electronic apparatus 1 based on, for example, cost, time, safety, or a combination thereof. The VM providing unit 22 may analyze at least one of the virtual resource state information of the electronic apparatus 1, the configuration of VMs already downloaded to the electronic apparatus 1, and/or the user's behavior in using VMs. Based on the analysis, the VM providing unit 22 may suggest a method by which the electronic apparatus 1 may efficiently utilize virtual resources.

When the user of the electronic apparatus 1 selects a VM from the VM list provided by the VM providing unit 22, the VM downloading unit 24 receives the selection and provides the selected VM so that the selected VM may be downloaded to the electronic apparatus 1.

Figure 7:
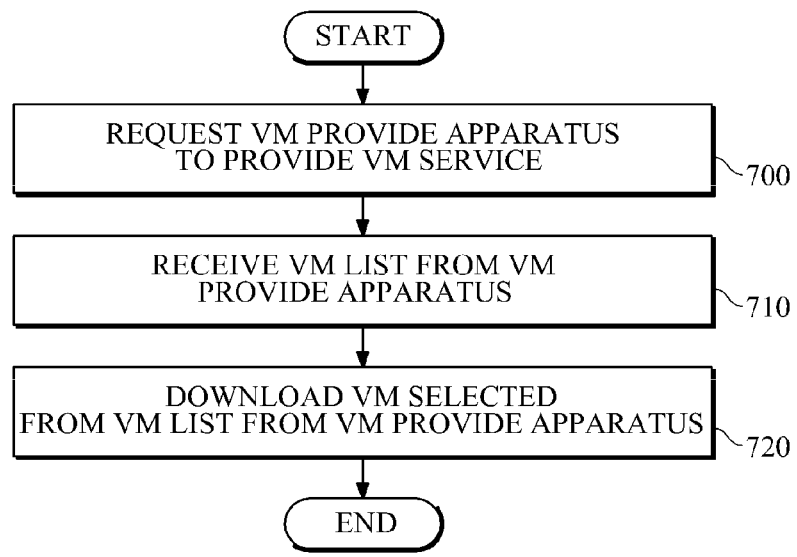
FIG. 7 is a flowchart illustrating an example method of receiving a VM service using an electronic apparatus.

FIG. 7 is a flowchart that illustrates a method of receiving a VM service using an electronic apparatus, for example, the electronic apparatus 1 of FIG. 1, with respect to a VM providing apparatus, for example, the VM providing apparatus 2 of FIG. 1.

Referring to FIG. 7, the electronic apparatus transmits a VM service request signal to a VM providing apparatus that offers VM services in 700. A communication channel may be created between the electronic apparatus and the VM providing apparatus, in 700. A uniform resource locator (URL) may be used as access information of the VM providing apparatus.

The URL of the VM providing apparatus may be embedded in the electronic apparatus as a basic setting and may be updated. Because the electronic apparatus may be either a mobile terminal or a fixed terminal, various network channels may be used to connect the electronic apparatus to the VM providing apparatus. For example, the network channels may be, but are not limited to, a wired/wireless local area network (LAN), an over-the-air (OTA) communication channel, a universal serial bus (USB), a wide area network (WAN), a virtual private network (VPN), a satellite network, Institute of Electrical and Electronics Engineers (IEEE) 1394, a removable storage device, and the like.

When the electronic apparatus transmits a VM service request signal to the VM providing apparatus, the electronic apparatus may analyze a user's behavior in using VMs included therein and request the VM providing apparatus to provide a VM service desired by the user based on the analysis. The electronic apparatus may transmit the VM service request signal, which includes at least one of the device profile, user profile, and virtual resource state information of the electronic apparatus, to the VM providing apparatus.

After the VM providing apparatus generates a VM list in response to the VM service request signal, the electronic apparatus receives the generated VM list from the VM providing apparatus, in 710. The electronic apparatus selects one or more VMs from the VM list provided by the VM providing apparatus, in 710. The VM list received from the VM providing apparatus may be a VM list recommended by the VM providing apparatus based on probability of use, cost, time, safety, or a combination thereof. As another example, a list of VMs suitable for the state of the electronic apparatus of the user may be selected based on data sent to the VM providing apparatus, before the receiving of the generated VM list.

When the user of the electronic apparatus selects a VM from the VM list, the electronic apparatus downloads the selected VM from the VM providing apparatus, in 720. In 720, a communication channel used to connect the electronic apparatus to the VM providing apparatus may also be used to download the selected VM to the electronic apparatus. However, an area where the electronic apparatus is located or communication conditions of the electronic apparatus may change over time. Thus, the communication channel may be changed or reset in view of the current surroundings of the electronic apparatus and the user. For example, the electronic apparatus may become aware of a new channel that may provide more efficient download of the VM, and choose to change the communication channel between the electronic apparatus and the VM providing apparatus.

Before downloading of the selected VM in 720, the method may further include configuring new VM specifications using the electronic apparatus when the electronic apparatus fails to find a desired VM from the VM list. For example, when the electronic apparatus fails to find a VM desired by the user in the VM providing apparatus, the user may configure desired VM specifications. When the VM providing apparatus creates a new VM using the specifications configured by the user, the electronic apparatus may download the created VM from the VM providing apparatus.

The method may further include receiving meta information of VMs from the VM providing apparatus, requesting the VM providing apparatus to provide a VM selected by a select signal, and/or downloading the selected VM from the VM providing apparatus. The select signal may be generated by the user based on the received meta information.

Figure 8:
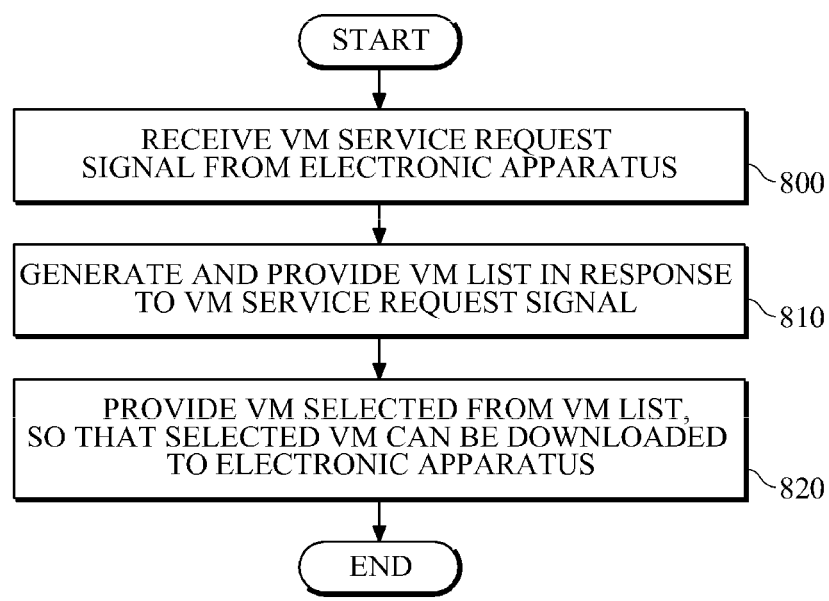
FIG. 8 is a flowchart illustrating an example method of providing a VM service using a VM providing apparatus.

FIG. 8 is a flowchart that illustrates an example of a method of providing a VM service using a VM providing apparatus, for example, the VM providing apparatus 2 of FIG. 1.

Referring to FIG. 8, the VM providing apparatus receives a VM service request signal from an electronic apparatus, for example, the electronic apparatus 1 of FIG. 1, in 800. For example, the VM providing apparatus may verify the identity of a user or subscriber of the electronic apparatus and measure the integrity of the electronic apparatus, in 800. In so doing, the VM providing apparatus may check the legality of using the VM downloaded to the electronic apparatus. In 800, the VM providing apparatus may receive a VM service request signal that includes at least one of the device profile, user profile, and/or virtual resource state information of the electronic apparatus.

In response to the VM service request signal received from the electronic apparatus, the VM providing apparatus generates a VM list and provides the generated VM list to the electronic apparatus, in 810. Using the information included in the VM service request signal received from the electronic apparatus, the VM providing apparatus may generate a list of VMs frequently used and/or likely to be used by the user and recommend the generated list to the electronic apparatus based on cost, time, safety, or a combination thereof.

When a user of the electronic apparatus selects a VM from the VM list, the VM providing apparatus provides the selected VM so that the selected VM may be downloaded to the electronic apparatus, in 820. If the VM selected by the user requires subscription or should be purchased, the VM providing apparatus may provide the user with information about how to purchase the VM. To purchase and pay for the VM, user authentication and safe payment processes may be performed. In some embodiments, the user authentication function of the AUICC may be used to verify the identity of the user.

Once the user decides to download the VM, the VM providing apparatus may provide the electronic apparatus with a downloading method. For example, the VM providing apparatus may provide the electronic apparatus with a downloading method selected by the user, or the VM providing apparatus may provide the downloading method based upon factors, for example, a least expensive downloading method, a quickest downloading method, a safest downloading method, and the like. When the VM providing apparatus provides the least expensive downloading method, it may provide information about estimated costs for one or more communication channels currently available to download a VM. When the VM providing apparatus provides the quickest downloading method, it may recommend to the electronic apparatus to download the VM using a combination of parallel channels, instead of a single channel. Accordingly, unlimited by cost or within a predetermined cost limit, the electronic apparatus may configure a channel that may ensure a maximum download speed.

As described above, an example electronic apparatus on which a VM runs like a physical device, an example VM providing apparatus, and example methods of transmitting and receiving a VM service using the electronic apparatus and the VM providing apparatus are provided. Thus, a need for a user to carry a separate device for each service or mobile service provider may be prevented. In addition, when changing to a new device, the user may not need to search for and install an application program on the new device or set the new device in order to have the settings of a previous device. This further enables easy device use and management.

According to various example(s) described above, the example electronic apparatus may download a VM from the VM providing apparatus using a wired or wireless communication channel. Therefore, various application programs or operating systems may be selected and used, regardless of mobile communication service. In addition, whenever a new mobile communication service is released, the electronic apparatus may download the new mobile communication service from the VM providing apparatus without having to modify its hardware.

The electronic apparatus may analyze a user's behavior in using VMs to identify VMs frequently used by the user. Based on the analysis, the electronic apparatus may determine the amount of virtual resources to be allocated. Also, the VM providing apparatus may recommend a VM based on the analysis.

The electronic apparatus described herein, may include software that acts as a virtualization for hardware. For example, the virtualized hardware may include a virtual central processing unit (CPU), a virtual memory management unit (MMU), a virtual keypad, and the like. The virtualized hardware may provide a platform for one or more operating systems to operate on top of the virtualized hardware, for example, a LINUX® operating system, a WINDOWS® operating system, a MACINTOSH operating system, and the like. The virtual hardware may provide migration of the operating systems and the software applications that run on top of the virtualized hardware.

In some embodiments, a mobile terminal may connect to the electronic apparatus, and use the electronic apparatus to access the VM providing apparatus through the electronic apparatus. For example, a mobile terminal may connect with a fixed terminal, such as a computer, and access a VM providing apparatus through the fixed terminal.

As described herein, the term "unit" may refer to a hardware component, a software component, and/or a combination thereof.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal or an electronic apparatus described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of communication or network communication consistent with that disclosed herein.

A computing system or a computer, as described herein, may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

The computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electronic apparatus comprising:
    a domain unit comprising a first domain zone having an embedded virtual machine and a second domain zone having one or more downloaded virtual machines (VMs), the first domain zone including a control unit to manage an allocation of virtual resources to the second domain zone;
    a hardware component to be used by the domain unit; and
    a virtual machine monitor to manage an access of the domain unit to the hardware component.

2. The electronic apparatus of claim 1, wherein the first domain zone comprises a plurality of first domains and the second domain zone comprises a plurality of second domains.

3. The electronic apparatus of claim 2, wherein the control unit manages allocation of virtual resources to the second domains included in the second domain zone by monitoring operation of the one or more downloaded VMs.

4. The electronic apparatus of claim 1, wherein the domain unit further comprises a service controller to transmit or receive a signal to receive a virtual machine service from a virtual machine providing apparatus.

5. The electronic apparatus of claim 1, wherein the second domain zone comprises a trusted domain zone and an untrusted domain zone based on accessibility to virtual resources.

6. The electronic apparatus of claim 5, wherein the control unit allocates a downloaded VM to the trusted domain zone or the untrusted domain zone based on a safety rating of the downloaded VM.

7. The electronic apparatus of claim 5, wherein the control unit moves a downloaded VM in the untrusted domain zone to the trusted domain zone when the safety rating of the downloaded VM is higher than a preset level, and moves the downloaded VM in the trusted domain zone to the untrusted domain zone when the safety rating of the downloaded VM is lower than the preset level.

8. The electronic apparatus of claim 7, wherein the control unit moves the downloaded VM in the untrusted domain zone to the trusted domain zone after receiving an approval signal from a user of the electronic apparatus.

9. The electronic apparatus of claim 7, wherein the control unit automatically moves the downloaded VM in the trusted domain zone to the untrusted domain zone.

10. The electronic apparatus of claim 1, wherein the first domain zone further includes a storage unit configured to store data commonly used by virtual domains included in the first domain zone and the second domain zone.

11. The electronic apparatus of claim 1, wherein the first domain zone is a built-in domain zone and the second domain zone is a downloaded VM domain zone.

12. The electronic apparatus of claim 1, wherein the second domain zone includes a trusted domain zone and an untrusted domain zone.

* * * * *